June 10, 1969

A. J. WILTSHIRE 3,449,182

METHOD OF MAKING A HOLLOW, FIBER REINFORCED
PLASTIC PRESSURE VESSEL

Filed May 16, 1966

INVENTOR.
ARTHUR J. WILTSHIRE

BY

ATTORNEY

United States Patent Office 3,449,182
Patented June 10, 1969

3,449,182
METHOD OF MAKING A HOLLOW, FIBER-REINFORCED PLASTIC PRESSURE VESSEL
Arthur J. Wiltshire, Cleveland, Ohio, assignor to Structural Fibers, Inc., Chardon, Ohio, a corporation of Ohio
Filed May 16, 1966, Ser. No. 550,280
Int. Cl. B29c 27/22, 25/00
U.S. Cl. 156—69  9 Claims

ABSTRACT OF THE DISCLOSURE

A filament winding technique for fabricating a hollow-filament-wound oblate, spheroidal pressure vessel. A flexible, hollow thermoplastic liner having an oblate spheroidal external configuration is subjected to an internal pressure while the flattened poles of the liner are restrained. A rigid winding mandrel is thus provided and the restraint on the flattened poles prevents the liner from assuming a spherical shape. Resin-impregnated continuous filaments are wound about the surface of the liner in a geodesic pattern. The restraint on the flattened poles of the liner is removed to permit the vessel to assume a neutral shape and the resin is then cured.

---

This invention relates to a method of fabricating a hollow, fiber-reinforced pressure vessel and, more particularly, to a method of fabricating a hollow, fiber-reinforced, oblate, spheroidal pressure vessel having a filament-wound sidewall.

Filament-wound pressure vessels have been widely accepted as vessels for the containment of pressurized fluid in those applications that require high stress levels and low density, excellent corrosion, impact, and shatter resistance, and highly predictable burst and cycle characteristics. Filament-wound pressure vessels are designed to take advantage of the high tensile strengths of certain filaments, such as glass fibers. Glass fibers have a modulus of $10 \times 10^6$ p.s.i. and a tensile strength of $5 \times 10^5$ p.s.i. and, in order to take advantage of these physical properties, it is important to orient the fibers so that substantially all of these fibers are subjected to tensile loads.

Pressure vessels have been wound with filaments so that the tensile loads are carried by the filaments. The prior art filament winding techniques involve winding the filament in a desired pattern about a rigid mandrel to form the pressure vessel. The external surface configuration of the mandrel conforms to the final desired surface configuration of the pressure vessel. According to these prior art techniques, the mandrel is formed from a fusible material, such as a low melting point metal or wax, which is removed from the interior of the wound pressure vessel by applying sufficient heat to melt the fusible core. Other mandrels have been molded from plaster of Paris and, after the winding and resin-curing steps, such mandrels are dissolved by a suitable fluid. It is often desirable to provide a filament-wound pressure vessel having a thermoplastic liner to minimize leakage and to provide corrosion resistance. Such liners are applied as a coating to the rigid mandrel prior to the winding operation.

Although these winding operations have produced satisfactory pressure vessels, the step of removing the rigid mandrel is cumbersome and comprises a major portion of the production time per pressure vessel. It is, accordingly, an object of the present invention to provide a method for making a filament-wound pressure vessel which eliminates many of the cumbersome steps in prior art filament winding techniques.

It is a more particular object of this invention to provide a method for making a hollow, fiber-reinforced plastic, oblate, spheroidal pressure vessel by winding a resin-impregnated filament onto a normally flexible liner.

These objects are accomplished by providing a hollow, thermoplastic liner having an oblate, spheroidal, external configuration, and subjecting the liner to an internal pressure while restraining the flattened poles of the liner to provide a rigid winding mandrel and to prevent the liner from assuming a spherical shape under its internal pressure. This rigid winding mandrel is then rotated about its polar axis and resin-impregnated filaments are wound on the liner in a geodesic pattern by repeatedly orbiting the filaments to be wound in a single, flat winding zone which passes through the geometric center of the liner. According to one aspect of this invention, the winding zone is more nearly aligned with the polar axis than with a plane perpendicular to the polar axis. After the winding operation has been completed, the restraint on the poles is relaxed and the pressure is increased so that the vessel will assume its true geometrical shape. Thereafter, the resin is cured to a rigid state.

These and other objects, features, and advantages of the invention will become more apparent from the following detailed description of the drawings.

Figure 1:
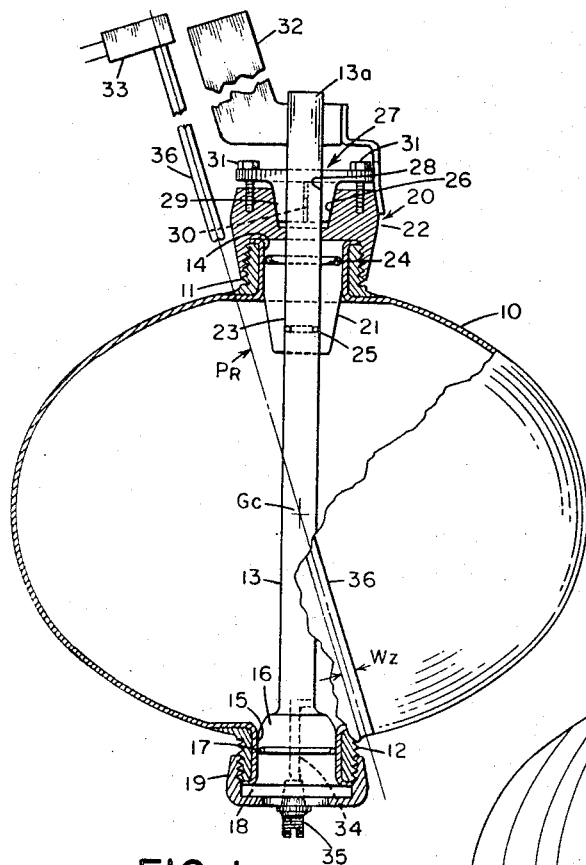
FIG. 1 is an elevational view, partly in section, of a pressure vessel liner mounted on an arbor and about to be wound with a filament in accordance with the teachings of this invention.
Figure 2:
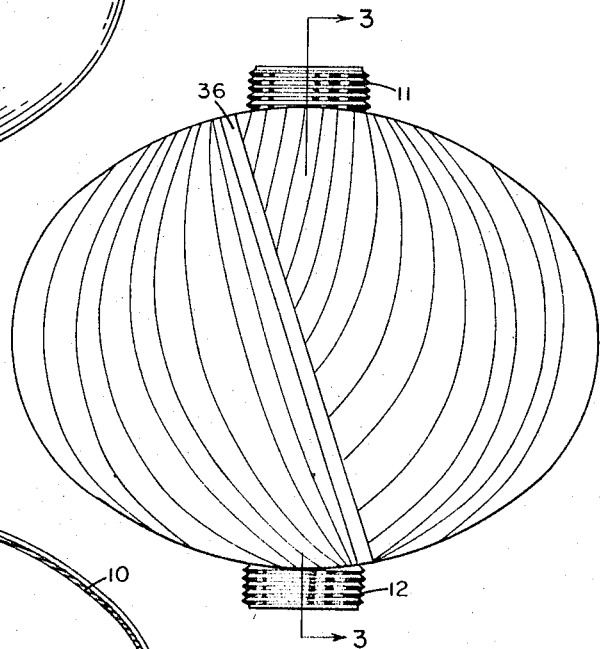
FIG. 2 is an elevational view of a pressure vessel produced in accordance with the present invention.
Figure 3:
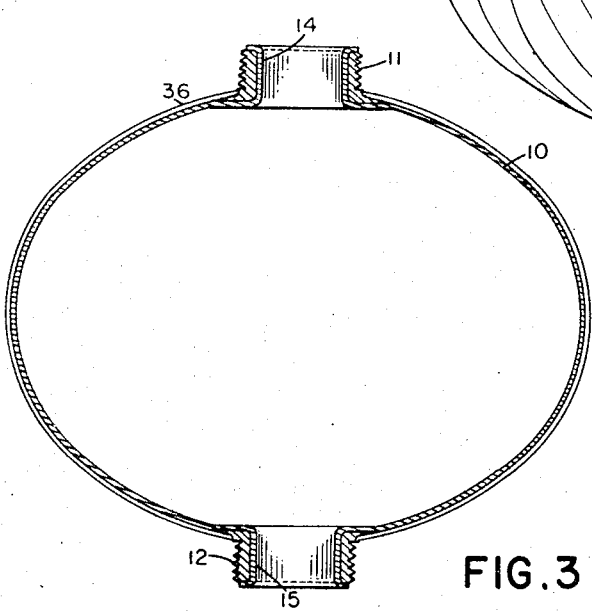
FIG. 3 is a cross sectional view of the pressure vessel, the plane of the section being indicated by the line 3—3 in FIG. 2.

Referring now to the drawings, a thermoplastic tank liner 10 is illustrated. The liner 10 may comprise a polypropylene shell having a thickness of one-sixteenth inch. The liner 10 may be rotationally cast or blow-molded into the approximate shape of the finished pressure vessel. The shape illustrated in an oblate spheroid having vertical, elliptical cross sections, with an ellipse ratio of 1.25:1.

The liner 10 is provided with fittings 11 and 12 at its flattened poles. These fittings may be cemented on or they may be molded into the liner when the liner is formed.

The liner 10 is mounted on an arbor 13 by inserting one end 13a of the arbor 13 first through a polar opening 15 and then through a polar opening 14, which openings are formed in the liner. One end of the arbor 13 has an enlarged head portion 16 which is received by the opening 15. The head 16 carries an O-ring 17 which provides a fluid-type seal between the head 16 and the opening 15. The head 16 is provided with an annular flange 18 which butts against the end of the opening 15. A cap 19 is threaded onto the fitting 12 to lock the fitting and, therefore, the liner relative to the arbor 13.

A hollow plug 20 serves to restrain the opening 14 relative to the arbor 13. The plug 20 includes a tapered, projecting end portion 21 which is received by the opening 14 and a threaded collar 22 which surrounds and threadedly engages the fitting 11. A fluid-type seal is effected between the plug 20 and the opening 14 and between an axial bore 23 of the plug 20 and the arbor 13 by O-rings 24 and 25 respectively.

The plug 20 has a conical bore 26 and the conical bore 26 receives a split taper clamp 27. The taper clamp 27 is provided with an axial bore 28 which receives the arbor 13 and a tapered projecting end portion 29 which is received by the conical bore 26. The end portion 29 is provided with a plurality of radial slots 30 which permit the taper clamp to tightly grip the arbor 13 as the clamp is wedged into the conical bore 26. The clamp 27 is fixed to the plug 20 by bolts 31. The degree to which the bolts 31 are tightened determines the radial force exerted on the arbor 13 by the clamp 27.

The end 13a of the arbor 13 is journalled for rotation about its axis in an arm 32 of a conventional polar winding machine (not shown). Such winding machines include a winding arm 33 which is adapted to orbit the liner 10 at a relatively high speed while the liner 10 is rotated about its polar axis at a relatively low speed. The winding arm 33 is adapted to orbit in a single plane designated by the plane $P_R$ in FIG. 1. The winding plane $P_R$ passes through the geometric center $G_C$ of the liner 10.

After the liner 10 has been mounted on the arbor 13 in the previously described manner, the interior of the liner is pressurized with a suitable fluid, such as air. There is provided a bore 34 through the head 16 and the arbor 13 which communicates with the interior of the liner 10. A valve 35 is provided at the outer end of the bore 34 and is connected to a suitable fluid pressure line to admit pressure to the interior of the liner 10. It should be noted that the liner 10 would tend to assume spherical shape upon being pressurized but, since the poles of the liner 10 are restrained during the pressurizing step by the assembly, including the arbor 13, its head 16, the cap 19, and the plug 20, this tendency is obviated. The liner 10 is pressurized to, for example, 10 p.s.i.g. so that it provides a rigid winding surface and, therefore, comprises a rigid winding mandrel for the winding operation, which will now be described.

A ribbon or band 36 is wound about the spheroidal sidewall of the liner 10 by attaching one end of the ribbon or band to a portion of the liner 10, a portion of the fitting 12, or a portion of the fitting 11, by a suitable cement, so that that end portion straddles or is bisected by the plane of rotation $P_R$.

The ribbon or band 36 may be a single filament or, preferably, may comprise a predetermined number of glass fiber filaments or rovings which are impregnated with a thermosetting resin, such as polyester resin, and grouped together to form the band. Each roving comprises a multiplicity of "ends" which, in turn, include a multiplicity of continuous glass filaments. A number of ends in each roving varies with the type of roving used, and the type and number of rovings employed in the process depends upon the particular structural characteristics desired so that the finished pressure vessel has predictable burst characteristics. The band 36 may be initially trained through a quantity of thermosetting resins and then trained through a resin stripper (not shown) so that the band has a resin to-glass-ratio of, for example 7:3 and 4:1. Alternately, the band may be preimpregnated with a predetermined amount of resin and then cured to its B state prior to the winding operation.

With one end of the band 36 attached to the liner 10, the fitting 12, or the fitting 11 in the previously described manner, the winding operation proceeds. During the winding operation, the liner 10 is rotated about its polar axis at a relatively slow speed and the winding arm 33 is orbited about the liner 10 in the plane of rotation $P_R$. The differential between the speed of the arm 33 and the rotation of the liner 10 determines the spacing between each turn of the band 36. The band 36, however, is wound onto the liner 10 in a single, flat winding zone $W_Z$. The width of the winding zone $W_Z$ corresponds to the width of the band 36 and the zone is bisected by the plane of rotation $P_R$. The winding operation continues until one or more layers of filaments completely envelop the liner 10. After the liner has been completely wrapped with filaments, the unwound end of the band 36 is severed and cemented to the pressure vessel.

After the winding operation has been completed, the taper clamp 27 is removed to permit the pressure vessel to assume a neutral shape. The pressure in the liner 10 is increased to allow the vessel to assume its true geometric shape. This increased pressure is preferably about 10 percent of the burst strength of the vessel. The thermosetting resin is then cured by subjecting the pressure vessel to an elevated temperature of between approximately 200° and 300° F. Such a temperature tends to soften the thermoplastic liner so that a satisfactory bond is obtained between the resin-impregnated filaments and the liner and, after such softening, the thermosetting resin cures to its rigid state. The pressure vessel is then permitted to cool to harden the thermoplastic liner and to produce a finished pressure vessel. The heating and cooling steps are conducted while the pressure vessel is attached to the arbor 13, and with the taper clamp 27 released, in order to ensure accurate alignment of the fittings 11 and 12.

What is claimed is:

1. A method of fabricating a hollow, fiber-reinforced plastic, oblate, spheroidal pressure vessel, comprising the steps of providing a flexible, hollow, thermoplastic liner having an oblate, spheroidal, external configuration, subjecting said liner to an internal pressure while restraining the flattened poles of the liner to provide a rigid winding mandrel and to prevent the liner from assuming a spherical shape, winding resin-impregnated continuous filaments about the surface of said liner in a geodesic pattern, removing the restraint on the flattened poles of the liner to permit the vessel to assume a neutral shape, and curing said resin.

2. A method of fabricating a hollow, fiber-reinforced plastic, oblate, spheroidal pressure vessel, comprising the steps of providing a flexible, hollow, thermoplastic liner having an oblate, spheroidal, external configuration, subjecting said liner to an internal pressure while restraining the flattened poles of the liner to provide a rigid winding mandrel and to prevent the liner from assuming a spherical shape, winding resin-impregnated continuous filaments about the surface of said liner in a geodesic pattern, removing the restraint on the flattened poles of the liner to permit the vessel to assume a neutral shape, increasing the internal pressure in said liner, and curing said resin.

3. A method of fabricating a hollow, fiber-reinforced plastic pressure vessel, comprising the steps of providing a flexible, hollow, thermoplastic liner, subjecting said liner to an internal pressure while restraining said liner in an oblate shape to provide a rigid winding mandrel, winding resin-impregnated continuous filaments about the surface of said liner, removing the restraint on said liner, and curing said resin.

4. A method of fabricating a hollow, fiber-reinforced plastic pressure vessel, comprising the steps of providing a flexible, hollow, thermoplastic liner, subjecting said liner to an internal pressure while restraining said liner in an oblate shape to provide a rigid winding mandrel, winding resin-impregnated continuous filaments about the surface of said liner, removing the restraint on said liner, increasing the internal pressure in said liner, and curing said resin.

5. A method of fabricating a hollow, fiber-reinforced plastic, oblate, spheroidal pressure vessel, comprising the steps of providing a flexible, hollow liner having an oblate, spheroidal, external configuration, subjecting said liner to an internal pressure while restraining the flattened poles of the liner to provide a rigid winding mandrel and to prevent the liner from assuming a spherical shape, impregnating continuous filaments with a thermosetting resin, rotating said liner about its polar axis while winding said impregnated filaments on said liner in a geodesic pattern by repeatedly orbiting the filaments to be wound in a single, flat winding zone passing through the geometric center of said liner, said winding zone being more nearly aligned with said polar axis than with a plane perpendicular to said polar axis, removing the restraint on the flattened poles of the liner to permit the vessel to assume a neutral shape, curing said resin, and relieving the internal pressure.

6. A method of fabricating a hollow, fiber-reinforced plastic, oblate, spheroidal pressure vessel, comprising the steps of providing a flexible, hollow liner having an oblate, spheroidal, external configuration, subjecting said liner to an internal pressure while restraining the flattened poles of the liner to provide a rigid winding mandrel and to prevent the liner from assuming a spherical shape, impregnating continuous filaments with a thermosetting resin, rotating said liner about its polar axis while winding said impregnated filaments on said liner in a geodesic pattern by repeatedly orbiting the filaments to be wound in a single, flat winding zone passing through the geometric center of said liner, said winding zone being more nearly aligned with said polar axis than with a plane perpendicular to said polar axis, removing the restraint on the flattened poles of the liner to permit the vessel to assume a neutral shape, increasing the internal pressure in said liner, curing said resin, and relieving the internal pressure.

7. A method of fabricating a hollow, fiber-reinforced plastic, oblate, spheroidal pressure vessel, comprising the steps of providing a flexible, hollow, thermoplastic liner having an oblate, spheroidal, external configuration, subjecting said liner to an internal pressure while restraining the flattened poles of the liner to provide a rigid winding mandrel and to prevent the liner from assuming a spherical shape, impregnating continuous filaments with a thermosetting resin, rotating said liner about its polar axis while winding said impregnated filaments on said liner in a geodesic pattern by repeatedly orbiting the filaments to be wound in a single, flat winding zone passing through the geometric center of said liner, said winding zone being more nearly aligned with the polar axis than with a plane perpendicular to said polar axis, removing the restraint on the flattened poles of the liner to permit the vessel to assume a neutral shape, heating the wound vessel to soften said liner, to fuse said liner to said continuous filaments, and to cure said resin, and relieving the internal pressure in said vessel.

8. A method of fabricating a hollow, fiber-reinforced plastic, oblate, spheroidal pressure vessel, comprising the steps of providing a flexible, hollow, thermoplastic liner having an oblate, spheroidal, external configuration, subjecting said liner to an internal pressure while restraining the flattened poles of the liner to provide a rigid winding mandrel and to prevent the liner from assuming a spherical shape, impregnating continuous filaments with a thermosetting resin, rotating said liner about its polar axis while winding said impregnated filaments on said liner in a geodesic pattern by repeatedly orbiting the filaments to be wound in a single, flat winding zone passing through the geometric center of said liner, said winding zone being more nearly aligned with the polar axis than with a plane perpendicular to said polar axis, removing the restraint on the flattened poles of the liner to permit the vessel to assume a neutral shape, increasing the internal pressure in said liner, heating the wound vessel to soften said liner, to fuse said liner to said continuous filaments, and to cure said resin, and relieving the internal pressure in said vessel.

9. The method according to claim 8 wherein said liner is subjected to an initial internal pressure of about 10 p.s.i. gauge and wherein the increased internal pressure is approximately ten percent of the burst strength of the completed pressure vessel.

References Cited
UNITED STATES PATENTS

| | | |
|---|---|---|
| 3,057,509 | 10/1962 | Bernd. |
| 3,282,757 | 11/1966 | Brussee _____ 156—69 |
| 3,210,228 | 10/1965 | Bluck _____ 156—173 XR |
| 3,137,405 | 6/1964 | Gorcey _____ 220—3 |
| 3,047,191 | 7/1962 | Young. |

EARL M. BERGERT, *Primary Examiner.*

PHILIP DIER, *Assistant Examiner.*

U.S. Cl. X.R.

156—156, 172; 220—3, 83; 264—314.